(12) United States Patent
Kim et al.

(10) Patent No.: US 10,191,712 B2
(45) Date of Patent: Jan. 29, 2019

(54) DISPLAY APPARATUS AND RECORDING MEDIUM

(71) Applicant: SAMSUNG ELECTRONICS CO., LTD., Suwon-si, Gyeonggi-do (KR)

(72) Inventors: Tae-hyeong Kim, Pyeongtaek-si (KR); Hwa-jun Doo, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/680,392

(22) Filed: Aug. 18, 2017

(65) Prior Publication Data

US 2018/0052652 A1 Feb. 22, 2018

(30) Foreign Application Priority Data

Aug. 19, 2016 (KR) .................. 10-2016-0105812

(51) Int. Cl.
| | |
|---|---|
| *G06F 3/14* | (2006.01) |
| *G09G 5/00* | (2006.01) |
| *G09G 5/397* | (2006.01) |
| *G06F 3/147* | (2006.01) |
| *G09G 5/377* | (2006.01) |

(52) U.S. Cl.
CPC .......... *G06F 3/1446* (2013.01); *G06F 3/147* (2013.01); *G09G 5/001* (2013.01); *G09G 5/377* (2013.01); *G09G 5/397* (2013.01); *G09G 2300/026* (2013.01); *G09G 2340/10* (2013.01); *G09G 2340/125* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 8,537,073 B1 | 9/2013 | Harris | |
| 2015/0130899 A1 | 5/2015 | Koizumi et al. | |
| 2015/0187333 A1* | 7/2015 | Loeffler | G06F 3/1438 |
| | | | 345/1.3 |
| 2015/0363154 A1* | 12/2015 | Frederick | G08C 17/02 |
| | | | 345/1.3 |

FOREIGN PATENT DOCUMENTS

| | | |
|---|---|---|
| EP | 2728857 | 5/2014 |
| KR | 10-2013-0056776 | 5/2013 |
| KR | 10-2014-0120122 | 10/2014 |

OTHER PUBLICATIONS

International Search Report and Written Opinion dated Dec. 11, 2017 in counterpart International Patent Application No. PCT/KR2017/008868.

* cited by examiner

*Primary Examiner* — Nurun N Flora
(74) *Attorney, Agent, or Firm* — Nixon & Vanderhye P.C.

(57) ABSTRACT

A display apparatus includes: a signal receiver configured to receive a video signal from an external first display apparatus; a signal processor configured to process the video signal received in the signal receiver; a display configured to display an image based on the video signal processed by the signal processor; and a controller configured to control the signal processor so that the display does not display an image based on a first frame of the video signal including a first on-screen-display (OSD) menu generated by the first display apparatus and to display an image based on a second frame of the video signal excluding the first OSD menu.

19 Claims, 11 Drawing Sheets

DISPLAY APPARATUS AND RECORDING MEDIUM

CROSS-REFERENCE TO RELATED APPLICATION

This application is based on and claims priority under 35 U.S.C. § 119 to Korean Patent Application No. 10-2016-0105812 filed on Aug. 19, 2016 in the Korean Intellectual Property Office, the disclosure of which is incorporated by reference herein in its entirety.

BACKGROUND

Field

The present disclosure relates generally to a display apparatus for displaying an image by processing an input video signal and a recording medium, and for example, to a display apparatus and a recording medium, in which an on screen display (OSD) image generated by a preceding first display apparatus is prevented from being displayed together with an original content image on a following second display apparatus in case that a video signal processed by the first display apparatus is received in and processed by the second display apparatus within a system where a plurality of display apparatuses are connected in series.

Description of Related Art

To compute and process predetermined information through certain processes, an electronic apparatus basically includes a central processing unit (CPU), a chipset, a memory, and the like electronic components for computation. Such an electronic apparatus may be classified variously in accordance with what information it processes and what purpose it serves. For example, the electronic apparatus is classified into an information processing apparatus such as a personal computer (PC), a server or the like for processing general information; an image processing apparatus for processing image information; an audio system for processing audio information; home appliances for performing various jobs in home; etc.

As a common electronic apparatus among them, the image processing apparatus receives a content signal including image data from the outside and processes the image data extracted from the content signal in accordance with various image processing processes. The image processing apparatus may display an image based on the processed image data on its own display panel, or output the processed image data to another display apparatus provided with a display panel so that the image can be displayed on the display panel. In particular, the image processing apparatus with display panel is generally called a display apparatus. The display apparatus may be for example used solely as a TV, a monitor, a portable multimedia player (PMP), a tablet computer, a mobile phone, etc. Further, a plurality of display apparatuses may be for example used to form a video wall. The video wall refers to a system that uses the plurality of display apparatuses arranged in the form of a matrix.

In the video wall required to have a specific function, a content video signal processed in a preceding display apparatus for displaying a content image may be for example received in and processed by the following display apparatus so that the content image can be displayed on the following display apparatus. In this case, an on screen display (OSD) image generated and displayed by the preceding display apparatus is reflected in the video signal, and therefore the OSD image is also displayed in addition to the content image on the following display apparatus. Such an OSD image is successively input to the display apparatuses connected in series. In other words, if all the display apparatuses display their respective OSD images, the Nth display apparatus connected in series displays N overlaid OSD images. Accordingly, a method or structure for preventing an OSD image generated in one display apparatus from being displayed on another display apparatus is required in the system based on the plurality of display apparatuses the display apparatus.

SUMMARY

According to an aspect of an example embodiment, a display apparatus is provided, the display apparatus including: a signal receiver configured to receive a video signal from an external first display apparatus; a signal processor configured to process the video signal received in the signal receiver; a display configured to display an image based on the video signal processed by the signal processor; and a controller configured to control the signal processor so that the display does not display an image based on a first frame of the video signal including a first on-screen-display (OSD) menu generated by the first display apparatus and displays an image based on a second frame of the video signal excluding the first OSD menu. Thus, even if the video signal received from the preceding display apparatus includes the OSD menu in units of the image frame, the display apparatus, the display apparatus displays the content image without the OSD menu.

The controller may perform control to generate a third frame corresponding to an order of the first frame in the video signal based on the second frame by image interpolation, and may perform control to display an image based on a video signal where the second frame is combined with the third frame instead of the first frame. Thus, the display apparatus can compensate for decrease in the number of image frames per unit time even though the first frame including the OSD menu is skipped.

The display apparatus may further include a signal transmitter comprising transmitting circuitry configured to transmit a video signal to an external second display apparatus, wherein the controller may control the signal transmitter to transmit the video signal, where the second frame and the third frame are combined, to the second display apparatus. Thus, the display apparatus can send the following display apparatus the video signal from which the OSD menu generated by the preceding display apparatus is removed.

The display apparatus may further include an input comprising circuitry configured to receive an input, wherein if an input for instructing a second OSD menu to be displayed on the display is made through the input, the controller may perform control to add the second OSD menu to the third frame and display an image including the second OSD menu. Thus, the display apparatus can prevent the OSD menu generated by itself from being displayed being overlaid with the OSD menu generated by the preceding display apparatus.

The controller may perform control to display images based on the second frame and the third frame by excluding the second OSD menu from the second frame in response to the input. Thus, the display apparatus provides the video signal so that the following display apparatus can skip the OSD menu in the video signal.

The controller may discriminate between the first frame and the second frame in the video signal based on preset identification information where a periodic order is previously set to image frames to be mix with the first OSD menu among the plurality of image frames of the video signal. Thus, the display apparatus can easily determine the image frame including the OSD menu without applying scanning and analyzing jobs to the image frame.

The display apparatus may further include a storage configured to store the identification information, wherein the controller may call for the identification information from the storage.

The controller may perform control to receive the identification information from the first display apparatus.

The controller may perform control to display images based on the first frame and the second frame if not receiving a notification about generation of the first OSD menu from the first display apparatus, and may skip the image of the first frame if receiving the notification from the first display apparatus.

According to an aspect of another example embodiment, a display apparatus is provided, the display apparatus including: a signal receiver configured to receive a video signal from a content source; a signal transmitter configured to communicate with an external display apparatus; a signal processor configured to process the video signal received in the signal receiver; a display configured to display an image based on the video signal processed by the signal processor; an input comprising input circuitry configured to receive an input for instructing an on-screen-display (OSD) menu to be displayed; and a controller configured to perform control to generate a video signal modified by mixing a first frame of the video signal with the OSD menu generated in response to the input, to control the display to display an image based on the modified video signal, and to transmit the modified video signal to the external display apparatus through the signal transmitter.

According to an aspect of another example embodiment, a recording medium having recorded thereon a program code of a method executable by a processor of a display apparatus is provided, the method including: receiving a video signal from an external first display apparatus; and displaying an image based on the video signal; wherein the displaying the image includes not displaying an image based on a first frame of the video signal including a first on-screen-display (OSD) menu generated by the first display apparatus and displaying an image based on a second frame of the video signal excluding the first OSD menu.

The displaying the image may include: generating a third frame corresponding to an order of the first frame in the video signal based on the second frame by image interpolation; and displaying an image based on a video signal where the second frame is combined with the third frame instead of the first frame.

The displaying the image may include transmitting the video signal, where the second frame and the third frame are combined, to a second display apparatus.

If an input for instructing a second OSD menu to be displayed is received, the displaying the image may include: adding the second OSD menu to the third frame; and displaying an image including the second OSD menu.

The displaying the image including the second OSD menu may include: displaying images based on the second frame and the third frame by excluding the second OSD menu from the second frame.

The displaying the image may include discriminating between the first frame and the second frame in the video signal based on preset identification information where a periodic order is previously set to image frames to be mixed with the first OSD menu among the plurality of image frames of the video signal.

The identification information may be previously stored in the display apparatus.

The identification information may be received from the first display apparatus.

The displaying the image may include: displaying images based on the first frame and the second frame if not receiving a notification about generation of the first OSD menu from the first display apparatus; and skipping the image of the first frame if receiving the notification from the first display apparatus.

BRIEF DESCRIPTION OF THE DRAWINGS

The above and/or other aspects, features and attendant advantages of the present disclosure will become apparent and more readily appreciated from the following detailed description, taken in conjunction with accompanying drawings, in which like reference numerals refer to like elements, and wherein.

DETAILED DESCRIPTION

Below, various example embodiments will be described in greater detail with reference to accompanying drawings. The following descriptions of the example embodiments are made by referring to elements illustrated in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure. Further, the example embodiments will describe elements directly related to the idea of the disclosure, and description of the other elements may be omitted.

Figure 1:
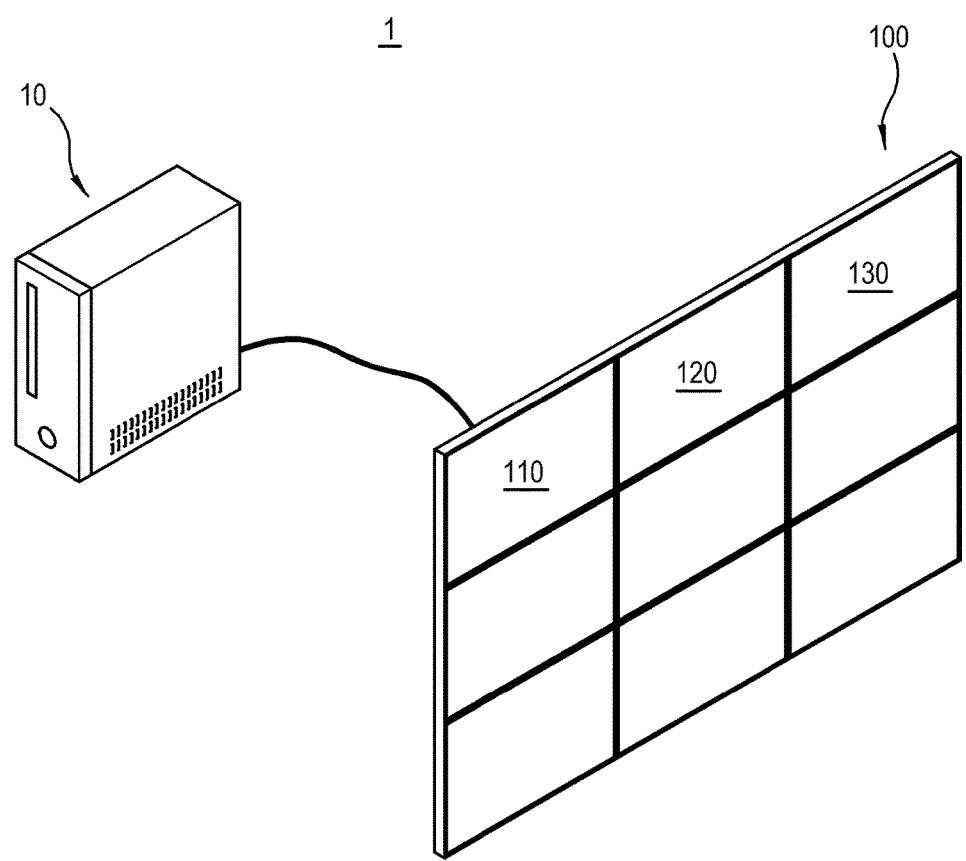
FIG. 1 is a diagram illustrating an example of an outer appearance of a system according to an example embodiment.

FIG. 1 is a diagram illustrating an example of an outer appearance of a system according to an example embodiment;

As illustrated in FIG. 1, a system 1 according to an example embodiment includes a plurality of display apparatuses 100 arranged in a matrix form to form a video wall. In this embodiment, the system 1 includes nine display apparatuses 100 arranged in a matrix form of 3 by 3, but this is given as just an example and does not limit the scope of the disclosure. Further, there are no limits to the number of display apparatuses 100 included in the system 1. Alternatively, the plurality of display apparatuses 100 may be irregularly arranged without having the matrix form for the video wall.

In the system 1, the plurality of display apparatuses 100 are arranged in the matrix form so that individual screens of the respective display apparatuses 100 can constitute one large full screen. With this structure, the system 1 may display one content image on the full screen, or an individual content image on each screen. If one content image is displayed on the full screen, the content image is segmented corresponding to relative positions of the respective display apparatuses 100 and each of the display apparatuses 100 displays the segmented content image.

The content video signal may be involved in the system or transmitted from the content source 10 connected through a network outside the system 1 to the plurality of display apparatuses 100. There are many methods of providing a video signal from the content source 10 to each of the display apparatuses 100. As one of the methods, cables are connected from the content sources 10 to the display apparatuses 100, and thus a video signal is transmitted to each of the display apparatuses 100 through the respective cables.

In this embodiment, the content source 10 is connected to a first display apparatus 110 among the plurality of display apparatuses 100 by a first cable, the first display apparatus 110 is connected to the second display apparatus 120 by a second cable, and the second display apparatus 120 is connected to the third display apparatus 130 by a third cable. That is, the content source 10 transmits a video signal to the first display apparatus 110, and the first display apparatus 110 transmits the video signal to the second display apparatus 120. Such a connection structure between the display apparatuses is inclusively referred to as a daisy chain. However, the term of 'daisy chain' does not limit a technical meaning of a structure but just indicates the foregoing connection structure.

In the daisy chain structure, for example, a video signal transmitted from the first display apparatus 110 to the second display apparatus 120 may be processed by the first display apparatus 110 or may be not processed by the first display apparatus 110.

In the former case, the first display apparatus 110 receives a video signal from the content source 10 processes it to be displayed as an image by itself, and outputs the processed video signal to the second display apparatus 12. That is, the video signal output to the second display apparatus 120 is previously processed by the first display apparatus 110 and thus different from the video signal output from the content source 10.

In the latter case, the first display apparatus 110 divides or copies the video signal received from the content source 10 into two signals, and processes one signal to be displayed as an image by itself while outputting the other signal to the second display apparatus 120. That is, the video signal output to the second display apparatus 120 is not processed by the first display apparatus 110 and thus the same as the video signal output from the content source 10.

The former case or the latter case may be selectively applied to the system 1 in accordance with functions or characteristics required in the system 1 as a designer or user connects the apparatus with cables and controls settings. Below, the former case, e.g., a mode where the output from the (N−1)th display apparatus is used as the input to the Nth display apparatus will be described by way of example.

Figure 2:
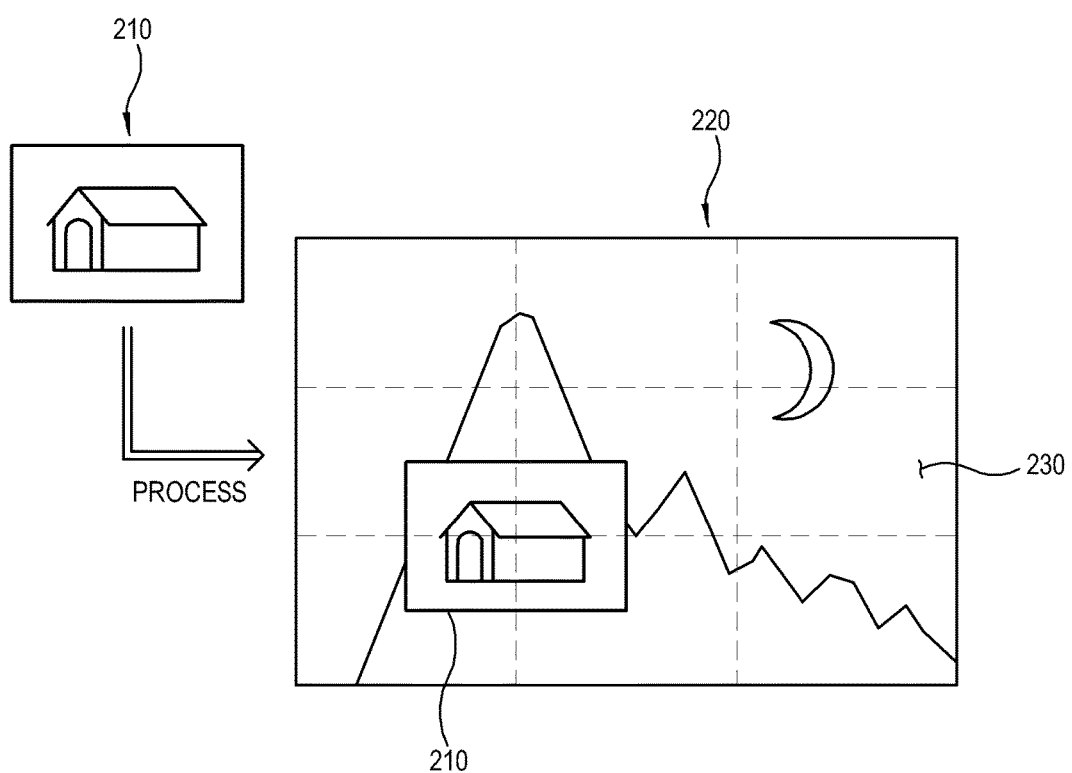
FIG. 2 is a diagram illustrating an example of a content image displayed on a full screen by a plurality of display apparatuses in the system according to an example embodiment.

FIG. 2 is a diagram illustrating an example of a content image displayed on a full screen by a plurality of display apparatuses in the system according to an example embodiment.

As illustrated in FIG. 2, if content of an original first image 210 is transmitted from a content source to the first display apparatus, the first display apparatus processes this content and generates a new second image 220. For example, the second image 220 may be generated by composing the first image 210 and a third image 230 as if the third image 230 is separately added to the background of the first image 210. While generating the second image 220, the first display apparatus may take on an area of a position corresponding to the first display apparatus among segmented areas of the second image 220, and outputs the content of the second image 220 to the second display apparatus.

The third image 230 mixed with the first image 210 may be a separate content image different from the first image 210, e.g., provided by another content source different from the content source of the first image 210. For example, the third image 230 may include a graphic on screen display (OSD) image generated in the first display apparatus.

If the second display apparatus receives the content of the second image 220 from the first display apparatus, the second display apparatus takes on an area of a position corresponding to the second display apparatus among the segmented areas of the second image 220, and outputs the content of the second image 220 to the third display apparatus. In this manner, all the display apparatuses in the system are operated to display the second image 220 on the full screen made by the plurality of display apparatuses.

If the content received in the second display apparatus is the same as the content output from the first content source, it is difficult to perform the foregoing operations in the system. In this embodiment, the content of the second image 220 generated in the first display apparatus is sent to the subsequent display apparatuses, so that the system can fully display the second image 220.

Like this, the mode where the output of the (N−1)th display apparatus is used as the input of the Nth display apparatus may be used to a system where the display apparatus is desired to not use the original image but generate and display a new image including the original image. However, the foregoing example is not the only case where such a mode is applied to the system.

Figure 3:
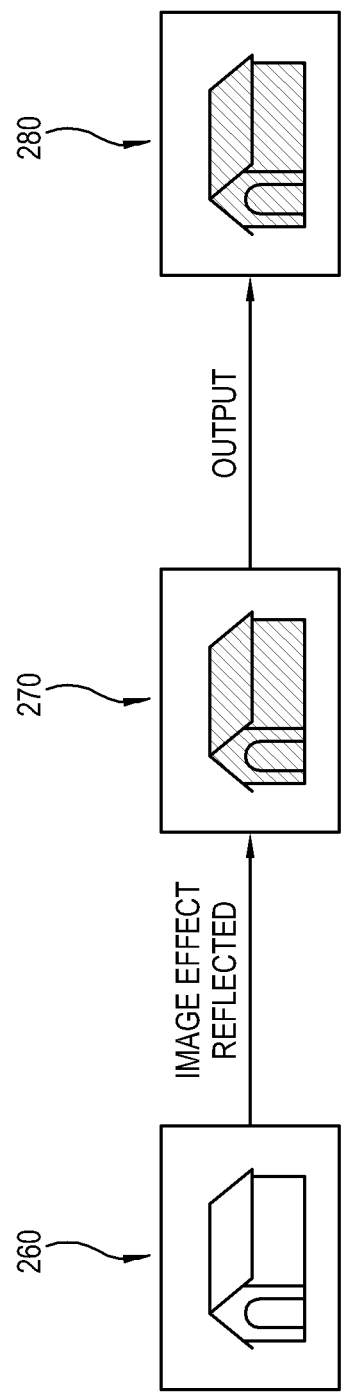
FIG. 3 is a diagram illustrating an example of a content image individually displayed in each display apparatus of the system according to an example embodiment.

FIG. 3 is a diagram illustrating an example of a content image individually displayed in each display apparatus of the system according to an example embodiment.

As illustrated in FIG. 3, a video signal of an original image 260 output from a content source is transmitted to a first display apparatus, the first display apparatus processes this video signal and displays a first image 270. The first display apparatus reflects a preset image effect in the original image 260 and thus converts the original image 260 into the first image 270.

If a second display apparatus can apply the same image effect to the original image 260 as the first display apparatus, the second display apparatus can display a second image 280, in which the same effect as the first display apparatus is reflected, even though it receives the video signal of the original image 260.

However, if the second display apparatus has no functions of reflecting this image effect in the image, the second display apparatus has to receive not the original image 260 from the content source but the first video signal of the processed first image 270 from the first display apparatus. Thus, the second display apparatus can display the second image 280 in which the same image effect as the first image 270 of the first display apparatus is reflected.

Like this, the mode where the output of the (N−1)th display apparatus is used as the input of the Nth display apparatus may be applied to the system when the image in which a specific image process is reflected by the preceding display apparatus is desired to be equally displayed on the following display apparatus.

Below, a case where a certain display apparatus displays an OSD menu image by itself when each display apparatus displays a content image as above in a system having a daisy chain structure according to the related art will be described.

Figure 4:
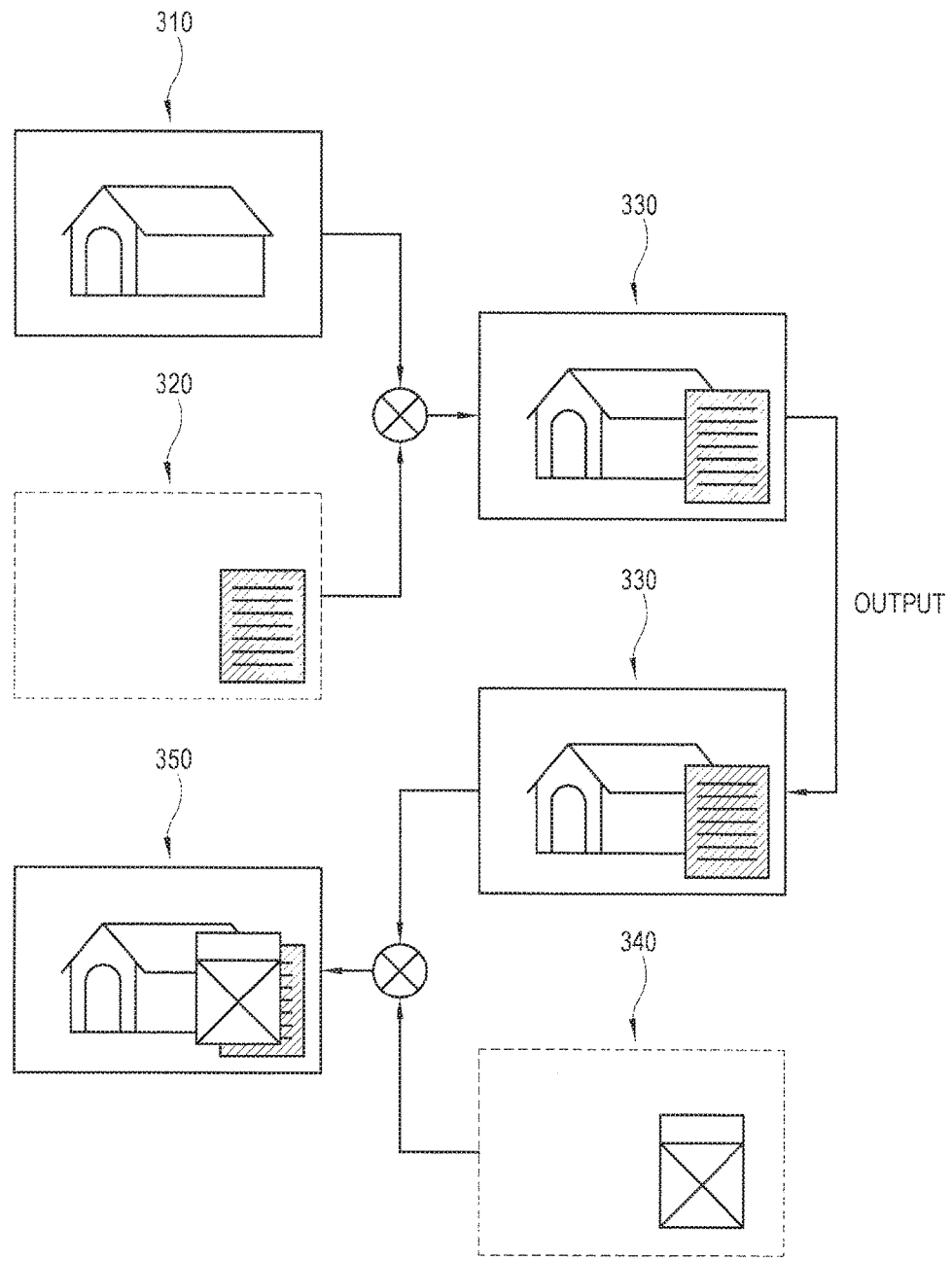
FIG. 4 is a diagram illustrating an example of an OSD menu image displayed with a content image in each of a first display apparatus and a second display apparatus of a system according to the related art.

FIG. 4 is a diagram illustrating an example of an OSD menu image displayed with a content image in each of a first display apparatus and a second display apparatus of a system according to the related art.

As illustrated in FIG. 4, in the system according to the related art, the first display apparatus receives a content image 310, e.g., an original image from the content source the content image. If a predetermined event such as a user's input occurs, the first display apparatus generates an OSD menu image 320 in response to this event and displays a first image 330 generated by mixing the content image 310 and the OSD menu image 320. The first display apparatus outputs the generated first image 330 generated as above to the second display apparatus.

The second display apparatus displays the first image 330 received from the first display apparatus. Since the first image 330 has already been generated in the first display apparatus by mixing the content image 310 and the OSD menu image 320, there is a problem that the OSD menu image 320 generated by the first display apparatus appears in the first image 330 displayed on the second display apparatus.

In this state, it will be taken into account that the second display apparatus is desired to independently display an OSD menu image 340. The second display apparatus does not display the content image 310 from the content source, but generates and displays a second image 350 by mixing the first image 330 received from the first display apparatus and the OSD menu image 340 generated by itself. In this case, the content image 310, the OSD menu image 320 and the OSD menu image 340 are overlaid to form the second image 350.

That is, according to the related art, the second display apparatus receives the first image 330 processed by the first display apparatus, and therefore unnecessarily displays the OSD menu image 320. Besides, when the second display apparatus independently displays the OSD menu image 340, there is a problem that the OSD menu image 340 is displayed being overlaid with the OSD menu image 320. If the OSD menu image 320 and the OSD menu image 340 are images having predetermined transparency, it may be difficult for a user to recognize content of the OSD menu image 340 even though the OSD menu image 340 is displayed as the topmost image among the images.

To address these problems, various example embodiments will be described in detail below.

Figure 5:
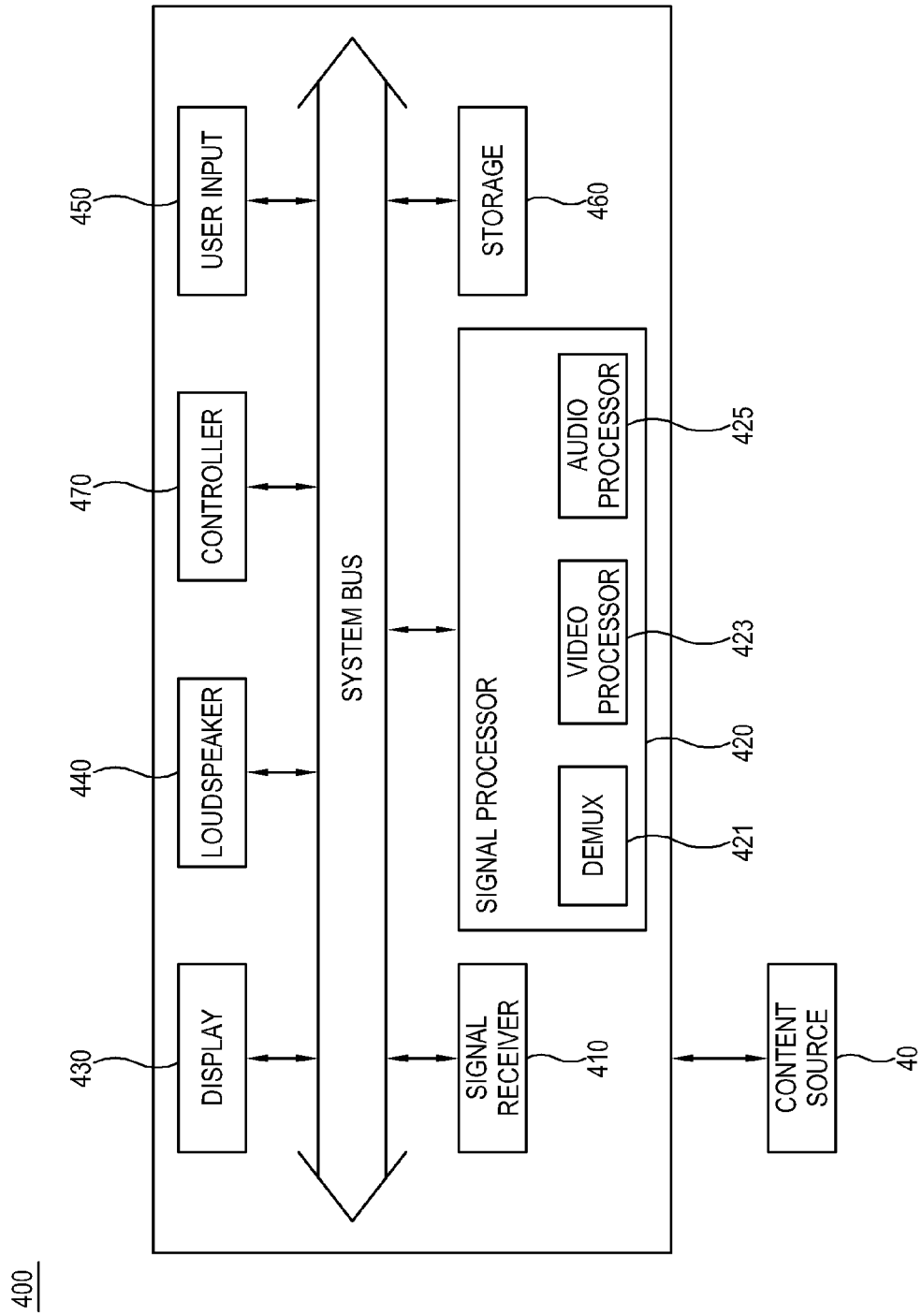
FIG. 5 is a block diagram illustrating an example display apparatus according to an example embodiment.

FIG. 5 is a block diagram illustrating an example display apparatus according to an example embodiment.

As illustrated in FIG. 5, a display apparatus 400 according to an example embodiment receives a content signal from various content sources 40. In this embodiment, the display apparatus 400 is a television (TV). However, this embodiment is not the only example of the present disclosure. The display apparatus 400 in this embodiment may be achieved by various kinds of apparatuses such as a tablet computer, a personal computer, a mobile phone, a wearable device and the like that can process a content signal to display a content image.

The display apparatus 400 includes a signal receiver 410 for receiving a content signal from the content source 40, a signal processor 420 for processing the content signal received through the signal receiver 410, a display 430 for displaying a content image based on the content signal processed by the signal processor 420, a loudspeaker 440 for outputting a content sound based on the content signal processed by the signal processor 420, a user input (e.g., including input circuitry) 450 for allowing a user to make an input, a storage 460 for storing data, and a controller (e.g., including processing circuitry) for performing processing computations of the signal processor 420 and general operations of the display apparatus 400. These elements may be connected through a system bus.

The signal receiver 410 includes a communication module comprising communication circuitry for receiving a content signal from an external apparatus such as the content source 40 or another display apparatus. The signal receiver 410 is basically configured to receive a signal or data from the outside, but not limited thereto. Alternatively, the signal receiver 410 may include a transceiver configured to perform bidirectional communication. For example, the signal receiver 410 may include various signal receiving circuitry, such as, for example, and without limitation, at least one among a tuning chip to be tuned to a designated frequency to receive a radio frequency (RF) broadcast signal; an Ethernet module to receive packet data from the Internet through a wire; a wireless communication module to wirelessly receive packet data through various standards such as Wi-Fi, Bluetooth, etc.; a connection port to which an external memory such as a universal serial bus (USB) memory is connected; and so on. That is, the signal receiver 410 includes a data input interface where communication modules, ports, etc. respectively corresponding to various communication protocols are combined.

In the present example embodiment, the signal receiver 410 connects with the external apparatus through a cable. The signal receiver 410 includes a signal receiver to which a signal input cable is connected, and a signal transmitter from which a signal is output. That is, a content video signal from another apparatus is received in the signal receiver, and a content video signal processed by the signal processor 420 is output through the signal transmitter.

The signal processor 420 may include various processing circuitry and performs various processes with regard to a content signal received in the signal transceiver 410 to thereby reproduce the content. The signal processor 420 may include various circuitry, such as, for example, and without limitation, a hardware processor achieved by a chipset, a buffer, a circuit, etc. mounted on to a printed circuit board, and may be achieved by a system on chip (SoC) in accordance with design methods. Basically, the signal processor 420 processes a content signal so that video content can be displayed on the display 430 and audio content can be output through the loudspeaker 440.

The signal processor 420 includes a demultiplexer (DEMUX) 421 to demultiplex a content signal into a video signal and an audio signal; a video processor 423 to process the video signal output from the DEMUX 421 in accordance with video processing processes so that the video content can be displayed on the display 430; and an audio processor 425 to process the audio signal output from the DEMUX 421 in accordance with audio processing processes so that the audio content can be output through the loudspeaker 440.

The DEMUX 421 divides multiplexed packets of the content signal in accordance with PID, and thus demultiplexes the content signal into sub signals such as a video signal, an audio signal, an appended data signal, etc. Among the demultiplexed sub signals, the video signal is output from the DEMUX 421 to the video processor 423, and the audio signal is output from the DEMUX 421 to the audio processor 425. However, all the content signals are not demultiplexed by the DEMUX 421. For example, if the content signal is transmitted to the display apparatus 400 as it is divided into a video signal and an audio signal, the demultiplexing process of the DEMUX 421 may be not needed.

The video processor 423 may be achieved, for example, and without limitation, by a hardware processor chip, and performs decoding, image enhancement, scaling and the like video processing processes with regard to a video signal, thereby outputting the processed video signal to the display 430. The video processor 423 may be designed to include combination of a plurality of processor chips.

The video processor 423 processes a video signal of a content signal so that a content image can be displayed on the display 430. In addition, the video processor 423 may generate a preset OSD menu in response to a user's input to the user input 450 and mix the generated OSD menu with the content image. To this end, the signal processor 420 may be designed to additionally include a graphic processor (not shown) for generating the OSD menu.

The audio processor 425 may be achieved, for example, and without limitation, by a hardware digital signal processor (DSP), and performs channel division, amplification, volume control and the like audio processing processes with regard to an audio signal, thereby outputting the processed audio signal to the loudspeaker 440. If the loudspeaker 440 includes a plurality of unit loudspeakers, the audio processor 425 divides and processes an audio signal according to channels, and outputs the processed signals divided corresponding to the channels to the unit loudspeakers, respectively.

The display 430 displays an image based on a video signal processed by the video processor 423. The display 430 may be achieved variously without limitation, and may have a light receiving structure of a liquid crystal display (LCD) type or a self-emissive structure of an organic light emitting diode (OLED) type, or the like. Further, the display 430 may include an additional element in accordance with its type. For example, if the display 430 includes an LCD type display panel, the display 430 includes a backlight unit for emitting light, a panel driving substrate for driving the display panel, etc.

The loudspeaker 440 outputs a sound based on audio data processed by the signal processor 420. The loudspeaker 440 includes a unit loudspeaker provided corresponding to audio data of a certain audio channel, and thus may include a plurality of unit loudspeakers corresponding to audio data of a plurality of audio channels The user input 450 may include various input circuitry and transmits various preset control command or information to the controller 470 in response to a user's control or input. That is, the user input 450 transmits various events generated by a user's control corresponding to the user's intention to the signal processor 420, so that the controller 470 can operate in response to the corresponding event.

The user input 450 may be variously achieved in accordance with methods of inputting information. For example, and without limitation the user input 450 may include a user interface environment such as a button key provided outside the display apparatus 400; a touch screen installed in the display 430; a microphone for a user's speech input; and a camera, a sensor or the like installed in the display apparatus 400 for photographing or sensing a user's gesture or the like. A remote controller may be a kind of the user interface environment. However, the remote controller is separated from a main body of the display apparatus 400, and thus transmits a control signal to the display apparatus 400 through a control signal receiver additionally provided in the main body of the display apparatus 400.

The storage 460 stores various pieces of data caused by the process and control of the signal processor 420 and the controller 470. The storage 460 is accessed by the signal processor 420 and the controller 470 to perform reading, writing, modifying, deleting, updating, etc. with regard to the data. The storage 460 includes a nonvolatile memory such as a flash memory, a hard disc drive, a solid state drive, etc. to retain data regardless of system power of the display apparatus 400, and a volatile memory such as a buffer, a random access memory (RAM), etc. to which data processed by the signal processor 420 is temporarily loaded.

The controller 470 may include various processing circuitry, such as, for example, and without limitation, a central processing unit (CPU), a micro-processor or the like, and controls the elements of the display apparatus 400 such as the signal processor 420.

With this structure, if a video signal received from a different display apparatus includes an OSD menu generated by the different display apparatus, the display apparatus according to this embodiment does not display a first image frame including the OSD menu among a plurality of image frames of the video signal but displays a second image frame excluding the OSD menu. The display apparatus generates a third image frame corresponding to order of the first image frame in the video signal by applying image interpolation to the second image frame, thereby displaying an image of the second image frame and the third image frame instead of the first image frame.

Thus, in the system including the plurality of display apparatuses, in which the output of the (N−1)th display apparatus is used as the input of the Nth display apparatus, the Nth display apparatus can display a content image excluding only the OSD menu generated in the (N−1)th display apparatus.

Figure 6:
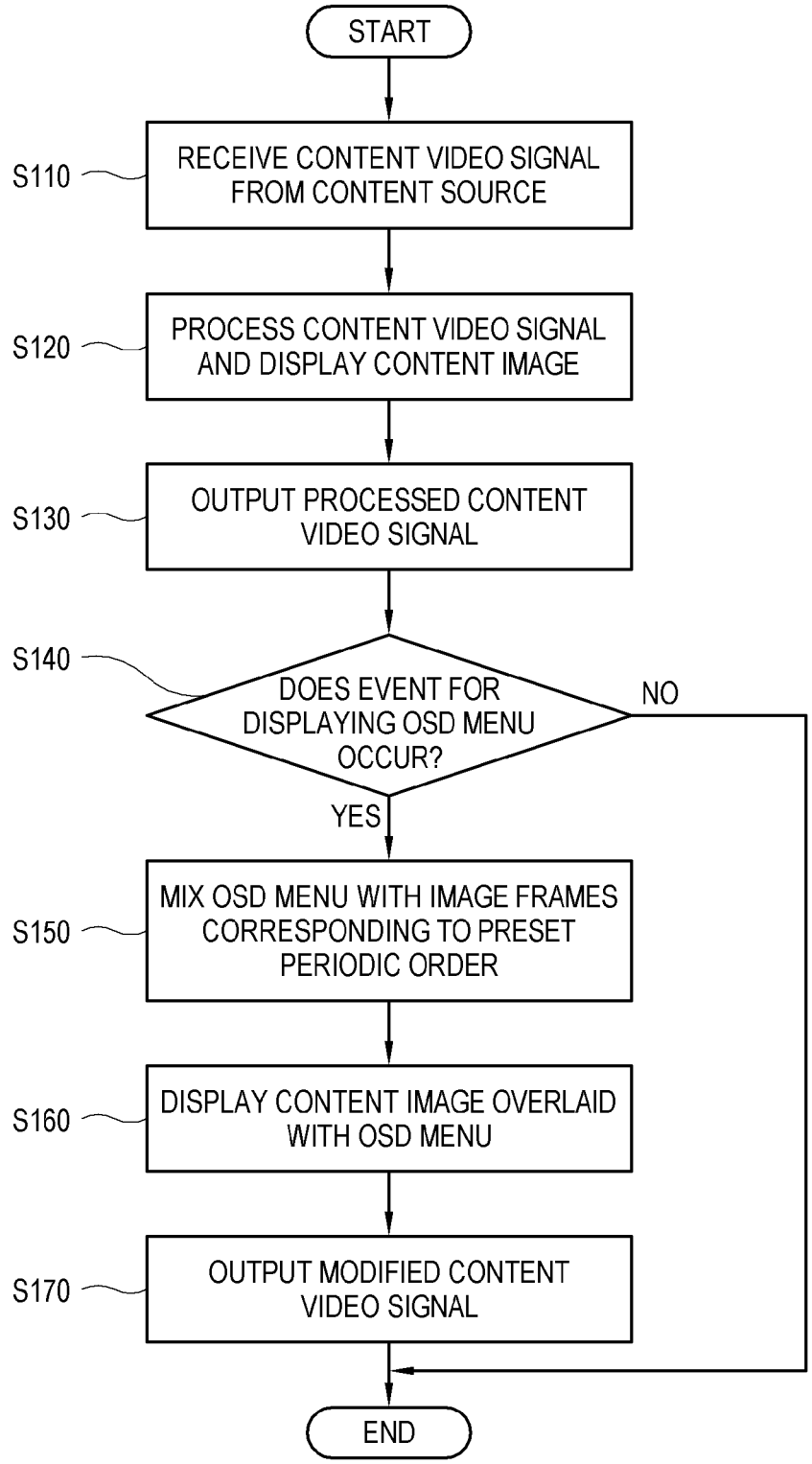
FIG. 6 is a flowchart illustrating an example method of controlling the display apparatus that receives a content image from a content source in the system according to an example embodiment.

FIG. 6 is a flowchart illustrating an example method of controlling the display apparatus that receives a content image from a content source in the system according to an example embodiment;

As illustrated in FIG. 6, at operation S110 the display apparatus receives a content video signal from a content source.

At operation S120 the display apparatus processes the content video signal and displays the content image.

At operation S130 the display apparatus outputs the content video signal to the following display apparatus. The output content video signal refers to a signal processed to be displayed as the content image in the display apparatus.

At operation S140 the display apparatus determines whether an event of instructing the OSD menu to be displayed occurs.

If this event occurs, at operation S150 the display apparatus generates the OSD menu, mixes the OSD menu with the image frames corresponding to preset periodic order among the content image frames, and modifies the content video signal. For example, the display apparatus may mix the OSD menu with the image frames corresponding to odd-numbered order among the content image frames. In this case, the display apparatus does not mix the OSD menu with the image frames corresponding to even-numbered order among the content image frames.

At operation S160 the display apparatus displays a content image overlaid with the OSD menu in accordance with the modified content video signal.

At operation S170 the display apparatus outputs the modified content video signal to the following display apparatus.

Thus, the first display apparatus, which first receives the content image from the content source, does not mix the OSD menu with all the image frames but mixes the OSD menu with only the image frames corresponding to the preset periodic order among all the image frames.

In this embodiment the display apparatus mixes the OSD menu with the odd-numbered image frames among the content image frames, but not limited thereto. Alternatively, the display apparatus may mix the OSD menu with the image frames corresponding to the preset periodic order among all the image frames, and the periodic order may be given with various numerical values according to design.

Figure 7:
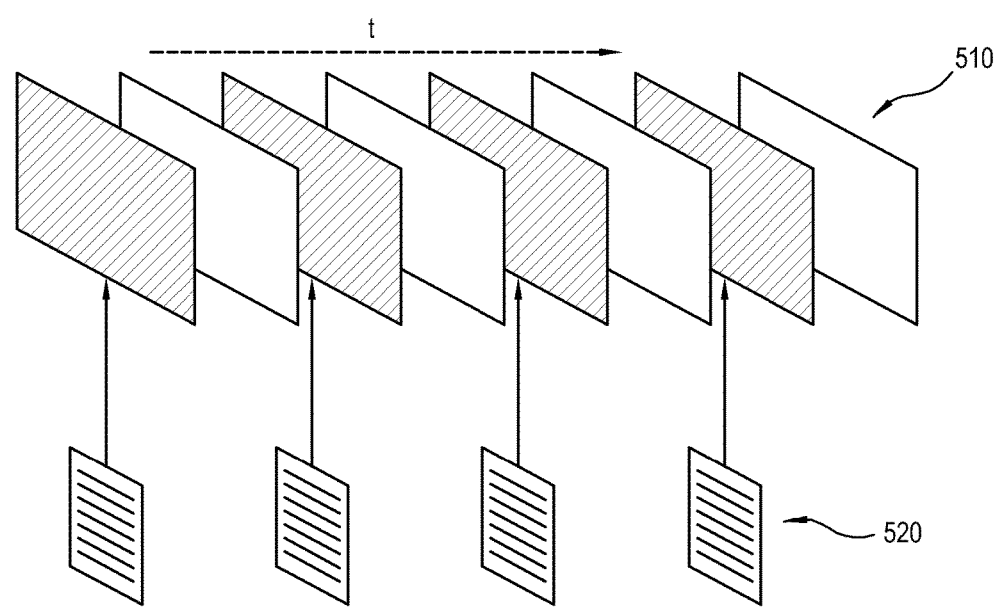
FIG. 7 is a diagram illustrating an example principle that the display apparatus selects image frames to be mixed with an OSD menu according to an example embodiment.

FIG. 7 is a diagram illustrating a principle that the display apparatus selects image frames to be mixed with an OSD menu according to an example embodiment.

As illustrated in FIG. 7, the display apparatus processes a content video signal including a plurality of image frames 510 arranged in order of time t. If an OSD menu 520 is generated, the display apparatus selects image frames corresponding to the preset periodic order among all the image frames 510. Here, various numerical values may be applied to the preset periodic order in accordance with previous settings. For instance, the display apparatus selects the odd-numbered image frames.

The display apparatus mixes the OSD menu 520 with each of the selected odd-numbered image frames, but does not mix the OSD menu 520 with each of the even-numbered image frames. Therefore, the OSD menu 520 appears together with not the even-numbered image frames but only the odd-numbered image frames among all the image frames 510.

Besides the odd-numbered or even-numbered image frames, the display apparatus may periodically select the image frames per n image frames, where n is a natural number not less than 2. The numerical value of n may be previously designated by a manufacturer or user.

As above, if the first display apparatus outputs the content video signal mixed with the OSD menu 520, the second display apparatus processes the content video signal. Below, operations of the second display apparatus according to an example embodiment will be described.

Figure 8:
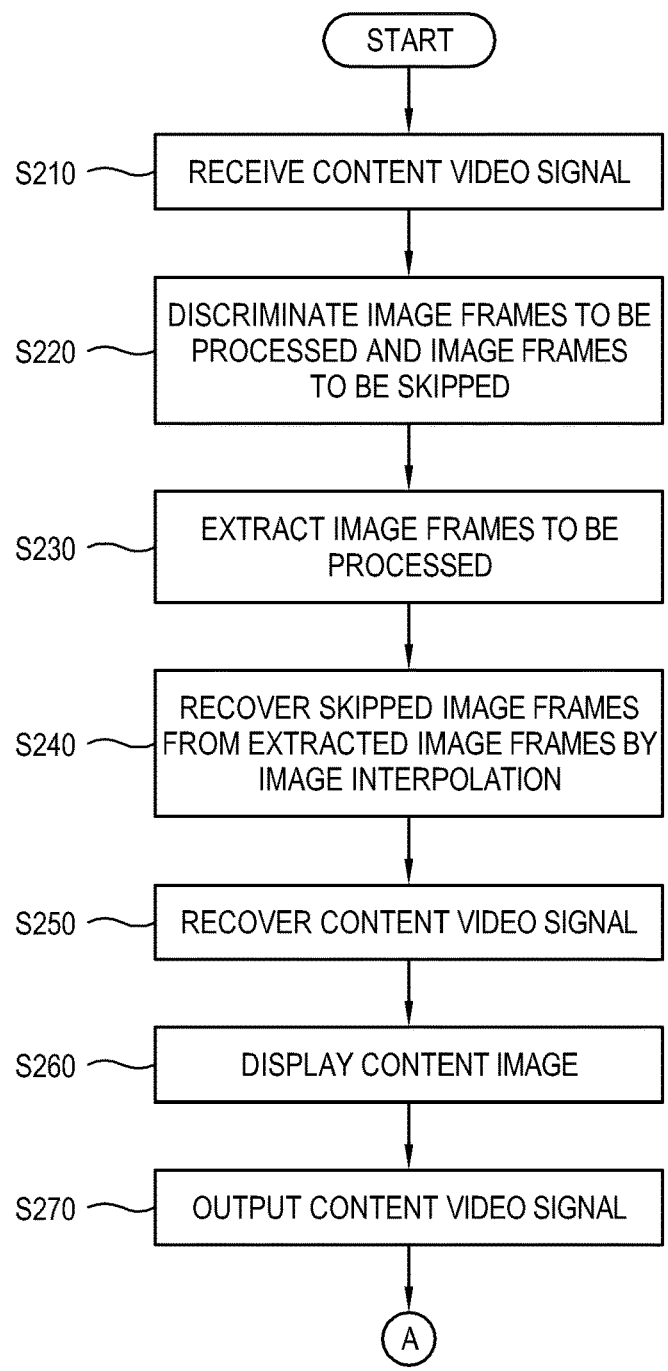
FIGS. 8 and 9 are flowcharts illustrating an example in which an Nth display apparatus processes a content video signal output from an (N−1)th display apparatus in the system according to an example embodiment.
Figure 9:
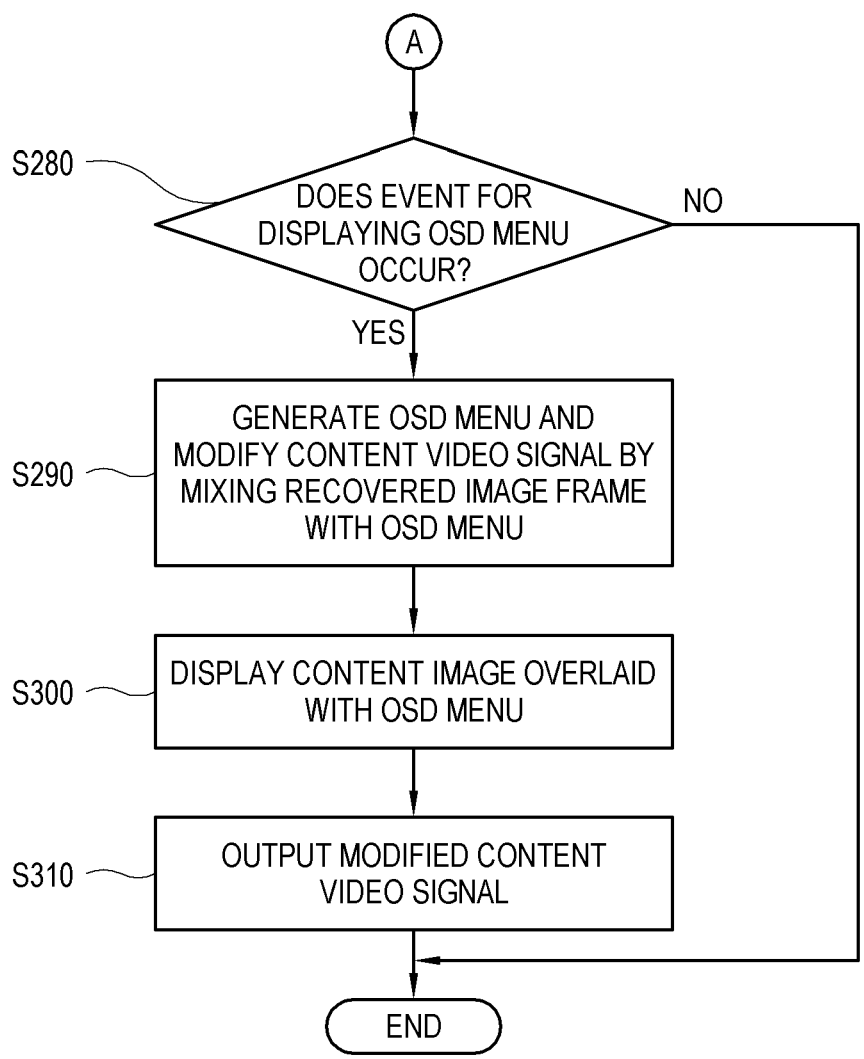

FIG. 8 and FIG. 9 are flowcharts illustrating an example in which an Nth display apparatus processes a content video signal output from an (N−1)th display apparatus in the system according to an example embodiment;

As illustrated in FIG. 8, at operation S210 the display apparatus receives a content video signal from the preceding display apparatus.

At operation S220 the display apparatus sorts (discriminates) the image frames of the content video signal into image frames to be processed and image frames to be skipped. A criterion of the assortment may be based on settings previously stored in the display apparatus or information received from the preceding display apparatus to the display apparatus.

At operation S230 the display apparatus extracts only the image frames to be processed from the content video signal.

For example, the display apparatus extracts not the odd-numbered image frames to be skipped but only the even-numbered image frames to be processed from the content video signal. As mentioned in the foregoing embodiment, the odd-numbered image frames include the OSD menu mixed by the preceding display apparatus, but the even-numbered image frames include no OSD menu.

By the way, such an extracting operation makes the image frames to be skipped be omitted from the content video signal. Therefore, the display apparatus has to recover the skipped image frames and recover the content video signal in order to display the content image normally.

At operation S240 the display apparatus recovers the skipped image frames from the extracted image frames by the image interpolation. For example, the display apparatus generates new odd-numbered image frames based on the even-numbered image frames by the image interpolation.

At operation S250 the display apparatus recovers the content video signal by combining the extracted image frames and the recovered image frames. For example, the display apparatus combines the even-numbered image frame and the newly generated odd-numbered image frames in order, thereby recovering the content video signal.

At operation S260 the display apparatus displays a content image based on the recovered content video signal.

At operation S270 the display apparatus outputs the content video signal processed as above.

As illustrated in FIG. 9, at operation S280 the display apparatus determines whether an event of instructing an OSD menu to be displayed occurs.

If this event occurs, at operation S290 the display apparatus generates the OSD menu, and mixes the generated OSD menu with the image frames recovered by the image interpolation, thereby modifying the content video signal. For example, the display apparatus mixes the OSD menu with the recovered image frames corresponding to the odd-numbered order, but does not mix the OSD menu with the image frames corresponding to the even-numbered order.

The frames to be mixed with the OSD menu does not have to be the image frames recovered by the image interpolation, but may be the image frames extracted in the foregoing operation S230. However, it is expected that the image frames of the video signal first provided from the content source are better in image quality than the image frames recovered in the display apparatus by the image interpolation even though it is a little bit, and therefore the OSD menu is mixed with the recovered image frames.

Further, if the operations according to this example embodiment are applied in common to the plurality of display apparatuses, the images displayed on the respective display apparatuses are made uniform in quality by mixing the OSD menu with the recovered image frames.

At operation S300 the display apparatus displays the content image overlaid with the OSD menu in accordance with the modified content video signal.

At operation S310 the display apparatus outputs the modified content video signal to the following display apparatus.

Like this, the Nth display apparatus processes the content video signal output from the (N−1)th display apparatus, and thus displays only the content image except the OSD menu generated by the (N−1)th display apparatus.

Below, a method that the Nth display apparatus processes the content video signal output from the (N−1)th display apparatus will be described in greater detail.

Figure 10:
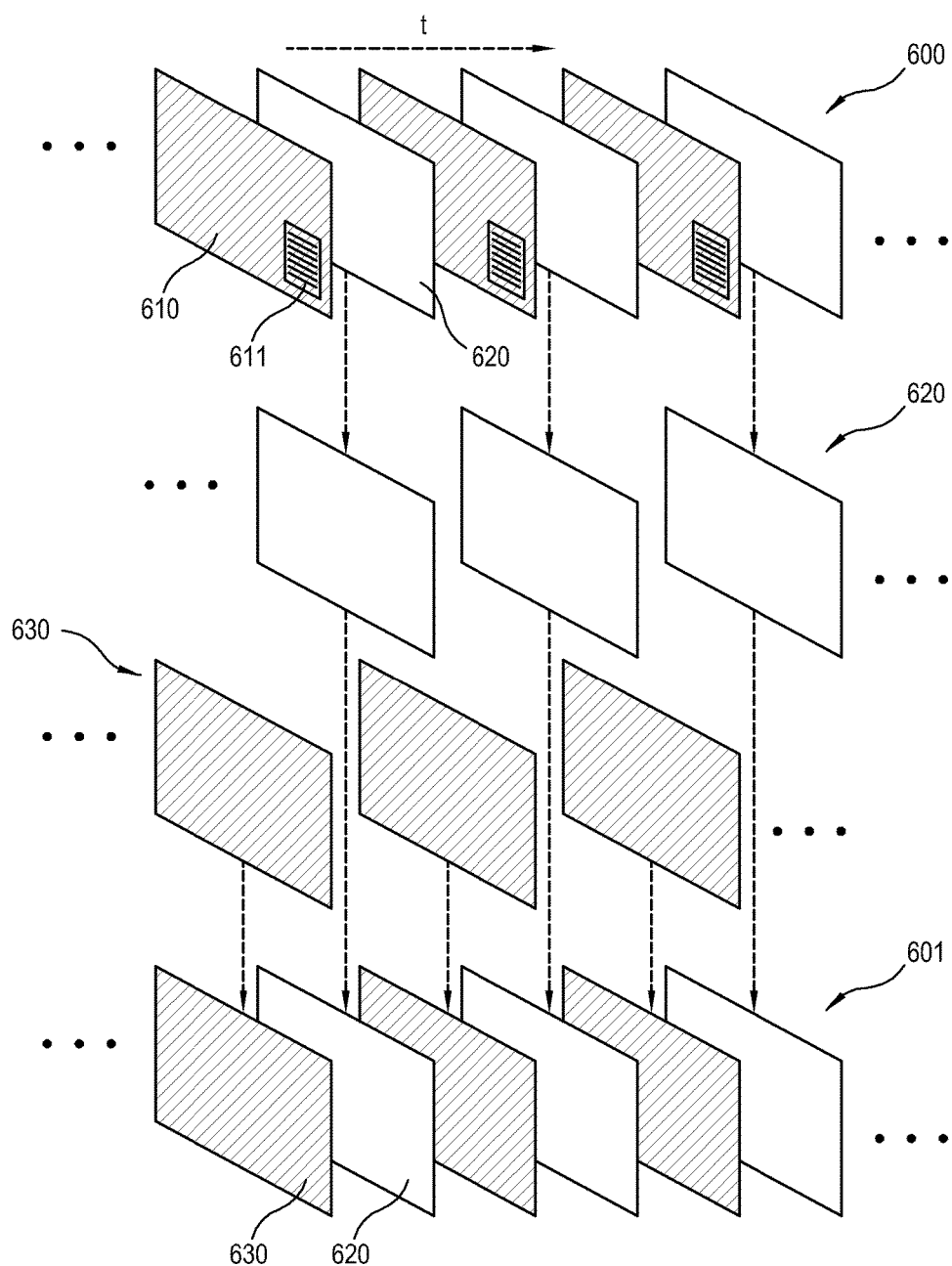
FIG. 10 is a diagram illustrating an example principle that the Nth display apparatus processes a content video signal output from the (N−1)th display apparatus according to an example embodiment.

FIG. 10 is a diagram illustrating a principle that the Nth display apparatus processes a content video signal output from the (N−1)th display apparatus according to an example embodiment.

As illustrated in FIG. 10, the Nth display apparatus receives a content video signal 600 from the (N−1)th display apparatus. The content video signal 600 includes a plurality of image frames 610 and 620 arranged in order of time t. Among the plurality of image frames 610 and 620, the odd-numbered image frame 610 may for example include the OSD menu 611 mixed by the (N−1)th display apparatus, and the even-numbered image frame 620 may include only the original content without the OSD menu 611.

The Nth display apparatus extracts the even-numbered image frame 620 including only the original content from the content video signal 600 while skipping the odd-numbered image frame 610 including the OSD menu 611. If the content video signal 600 is of 60 Hz, the even-numbered image frame 620 extracted from the content video signal 600 is of 30 Hz. Under this condition, it is difficult to normally display an image and therefore the Nth display apparatus recovers the skipped odd-numbered image frame 610, thereby recovering the content video signal 600 of 60 Hz.

Thus, the Nth display apparatus generates new odd-numbered image frames 630 based on the even-numbered image frames 620 by the image interpolation. For example, a certain odd-numbered image frame 630 may be generated by estimating presence and movement of an object in at least two previous and next sequential even-numbered image frames 620.

The Nth display apparatus combines such a generated odd-numbered image frame 630 and the even-numbered image frame 620 in chronological order, thereby finally generating a recovered content video signal 601. On the contrary to the content video signal 600, the content video signal 601 includes only the original content without the OSD menu 611 mixed by the (N−1)th display apparatus.

The Nth display apparatus outputs the content video signal 601 to the (N+1)th display apparatus while displaying the content image based on the content video signal 601. The (N+1)th display apparatus performs operations with regard to the received content video signal 601 on the same principle described as above. Likewise, all the display apparatuses in the system operate to properly display the content image.

If the Nth display apparatus generates an OSD menu by itself, the generated OSD menu is mixed with an odd-numbered image frame 630 recovered from the content video signal 601.

By the way, the Nth display apparatus may use various methods to determine the image frames, which are mixed with the OSD menu by the (N−1)th display apparatus, among the image frames. Of course, the Nth display apparatus may scan each image frame of the received content video signal and analyze pixel information in order to determine whether the image frames include the OSD menu. However, this method is not efficient since system load required for scanning and analyzing operations is relatively high.

One of the methods is to store setting information for selecting the image frames in common between the plurality of display apparatuses in the system. In this case, each display apparatus calls for the setting information, and determines the image frames, order of which is designated in the setting information, as the image frames mixed with the OSD menu. This setting information may be stored in each display apparatus when the display apparatus is manufactured.

Further, when the (N−1)th display apparatus outputs a content video signal to the Nth display apparatus, information for discriminating the image frame mixed with the OSD menu from other image frames in the video signal may be added as metadata to the video signal. This discrimination information may include notification information for notifying whether the OSD menu is involved in the image frame; identification information of identifying which image frames among all the image frames are mixed with the OSD menu; order information about the period of the image frames mixed with the OSD menu; position information of designating a relative position of a certain display apparatus within a matrix if the plurality of display apparatuses are arranged in a matrix form; etc. The Nth display apparatus can extract these pieces of information by demultiplexing the received content video signal.

Further, the (N−1)th display apparatus may transmit the discrimination information to the Nth display apparatus through a control line used for transmitting and receiving a control signal. Since such a control line is defined in accordance with standards of a cable for connecting the display apparatuses, an AUX line corresponding to DisplayPort standards of the cable, an HDMI-CEC line corresponding to high definition multimedia interface (HDMI) standards of the cable, etc. are employed as the control line.

If the control line is used in transmitting the information, it is more advantageous as follows than that of when the information is embedded in the content video signal. To embed the information into the content video signal, a field, which is not in current use among date fields defined in signal transmission standards, for example, a reserved field is used. However, such a reserved field may be in use for new transmission standards if the transmission standards are updated, and therefore there is a need of finding a new field in the transmission standards. On the other hand, if the control line is employed in transmitting the information, there are no needs of taking such points into account.

When the control line is employed, the following operations are also possible. For example, the Nth display apparatus does not always activate an algorithm for executing the processes described in the foregoing embodiments, but usually inactivates the algorithm. If the Nth display apparatus is informed by the (N−1)th display apparatus through the control line that the content video signal is mixed with the OSD menu, the corresponding algorithm is activated and used to recover the content video signal including no OSD menu.

Below, the image interpolation mentioned above will be described in brief. Basically, the interpolation refers to a method of obtaining a polynomial expression of connecting all previously given data points, and then calculating or estimating ungiven points based on this polynomial expression. That is, the interpolation is a kind of approximate calculation in which unknown values are estimated from already known near values by an interpolation function. As an example of the interpolation, there are a polynomial interpolation such as Lagrange interpolation, Newton interpolation and Hermite interpolation, which obtains only one polynomial expression connecting all data points throughout a range; and spline interpolation, e.g., piecewise polynomial interpolation such as a third spline interpolation and B-spline interpolation, etc.

The image interpolation refers to a method of applying the interpolation to image processing. As the image interpolation used in the image processing, there are nearest neighbor interpolation where a nearest neighbor pixel value is regarded as a new pixel; bilinear interpolation where a new pixel is calculated based on proportion by linearly connecting two pixels; high-order interpolation where a high-order function higher than a cubic function is used to calculate a new pixel; etc.

In this example embodiment, the display apparatus is configured to recover the skipped image frame by various methods of using the image interpolation.

Figure 11:
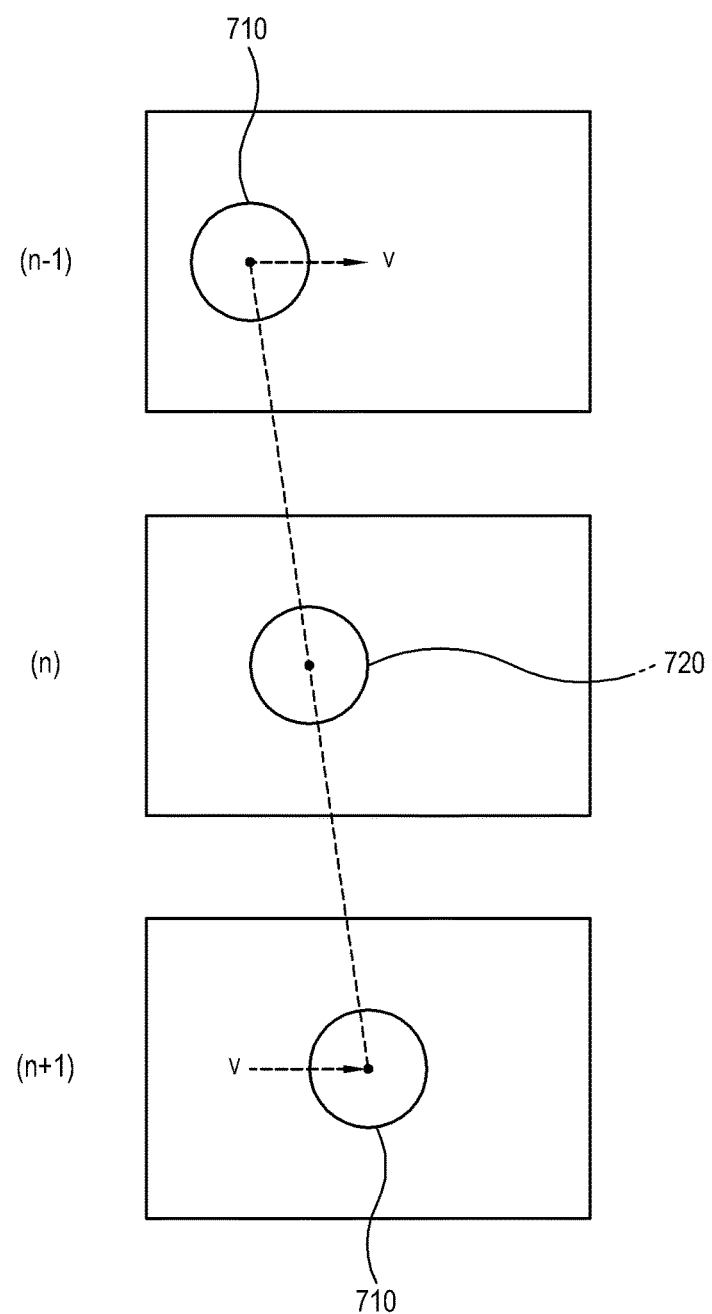
FIG. 11 is a diagram illustrating an example principle that the display apparatus interpolates an image according to an example embodiment.

FIG. 11 is a diagram illustrating a principle that the display apparatus interpolates an image according to an example embodiment.

As illustrated in FIG. 11, the display apparatus may estimate and generate a nth image frame interposed in time between a (n−1)th image frame and a (n+1)th image frame when the (n−1)th image frame and the (n+1)th image frame are given. For example, if the (n−1)th image frame and the (n+1)th image frame have an object 710 in common with each other, it is possible to obtain a movement vector V of the object 710 based on a position of the object 710 in the (n−1)th image frame and a position of the object 710 in the (n+1)th image frame.

Since the object 710 moves based on a direction and magnitude of the movement vector v between the (n−1)th image frame and the (n+1)th image frame, it is possible to estimate a position of an object 720 in the nth image frame based on the movement vector v. In this embodiment, the movement vector v of the object 710 is obtained from only two image frames, i.e. the (n−1)th image frame and the (n+1)th image frame, but not limited thereto. Alternatively, a plurality of image frames near in time to these image frames may be additionally taken into account.

According to this embodiment, the image interpolation is performed with respect to a certain object in the image frame is interpolation. Alternatively, the image interpolation may be performed in units of pixel. Further, various methods of the image interpolation may be complexly used to obtain pixel values with regard to a hole area generated while creating the nth image frame.

The foregoing example embodiment is one example of recovering the image frames by the image interpolation. In practice, various methods may be used to recover the image frames.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display apparatus comprising:
    a signal receiver configured to receive a video signal from an external display apparatus;
    a signal processor configured to process the video signal received by the signal receiver;
    a display configured to display an image based on the video signal processed by the signal processor; and
    a controller configured to:
    among a plurality of frames in the video signal, identify a first frame including a first on-screen-display (OSD) menu generated by the external display apparatus and a second frame not including the first OSD menu, and
    control the signal processor so that the display does not display an image based on the first frame of the video and displays an image based on the second frame of the video signal.

2. The display apparatus according to claim 1, wherein the controller is configured to perform control to generate a third frame corresponding to an order of the first frame in the video signal based on the second frame by image interpolation, and to perform control to display an image based on a video signal in which the second frame is combined with the third frame and is not combined with the first frame.

3. The display apparatus according to claim 2, further comprising a signal transmitter configured to transmit a video signal to a second external display apparatus,
    wherein the controller is configured to control the signal transmitter to transmit the video signal in which the second frame and the third frame are combined, to the second external display apparatus.

4. The display apparatus according to claim 2, further comprising an input comprising circuitry configured to receive an input,
    wherein if an input for instructing a second OSD menu to be displayed on the display is received through the input, the controller is configured to perform control to add the second OSD menu to the third frame and display an image including the second OSD menu.

5. The display apparatus according to claim 4, wherein the controller is configured to perform control to display images based on the second frame and the third frame excluding the second OSD menu from the second frame in response to the input.

6. The display apparatus according to claim 1, wherein the controller is configured to discriminate between the first frame and the second frame in the video signal based on preset identification information wherein a periodic order is previously set to image frames to be mixed with the first OSD menu from among the plurality of image frames of the video signal.

7. The display apparatus according to claim 6, further comprising a storage configured to store the identification information,
wherein the controller is configured to call for the identification information from the storage.

8. The display apparatus according to claim 6, wherein the controller is configured to perform control to receive the identification information from the external display apparatus.

9. The display apparatus according to claim 1, wherein the controller is configured to perform control to display images based on the first frame and the second frame if a notification about generation of the first OSD menu from the external display apparatus is not received, and to skip the image of the first frame if the notification from the external display apparatus is received.

10. A display apparatus comprising:
a signal receiver configured to receive a video signal comprising first, second, and third consecutive frames from a content source;
a signal transmitter configured to communicate with an external display apparatus;
a signal processor configured to process the video signal received by the signal receiver;
a display configured to display an image based on the video signal processed by the signal processor;
an input comprising circuitry configured to receive an input for instructing an on-screen-display (OSD) menu to be displayed; and
a controller configured to perform control generate a video signal modified by mixing the first and third frames, but not the second frame provided therebetween, of the video signal with the OSD menu generated in response to the input, to control the display to display an image based on the modified video signal, and to transmit the modified video signal to the external display apparatus through the signal transmitter.

11. A non-transitory computer readable recording medium having recorded thereon a program code which, when executed by a processor of a display apparatus, causes the display apparatus to perform a method, the method comprising:
receiving a video signal from an external display apparatus; and
displaying an image based on the video signal;
among a plurality of frames in the video signal, identifying a first frame including a first on-screen-display (OSD) menu generated by the external display apparatus and a second frame not including the first OSD menu, and
wherein the displaying the image comprises not displaying an image based on the first frame of the video signal and displaying an image based on the second frame of the video signal.

12. The method of claim 11, wherein the displaying the image comprises:
generating a third frame corresponding to an order of the first frame in the video signal based on the second frame by image interpolation; and
displaying an image based on a video signal where the second frame is combined with the third frame and is not combined with the first frame.

13. The method of claim 12, wherein the displaying the image comprises transmitting the video signal, in which the second frame and the third frame are combined, to a second external display apparatus.

14. The method of claim 12, wherein, if an input for instructing a second OSD menu to be displayed is made, the displaying the image comprises:
adding the second OSD menu to the third frame; and
displaying an image including the second OSD menu.

15. The method of claim 14, wherein the displaying the image including the second OSD menu comprises:
displaying images based on the second frame and the third frame by excluding the second OSD menu from the second frame.

16. The method of claim 11, wherein the displaying the image comprises discriminating between the first frame and the second frame in the video signal based on preset identification information where a periodic order is previously set to image frames to be mixed with the first OSD menu from among the plurality of image frames of the video signal.

17. The method of claim 16, wherein the identification information is previously stored in the display apparatus.

18. The method of claim 16, wherein the identification information is received from the external display apparatus.

19. The method of claim 11, wherein the displaying the image comprises:
displaying images based on the first frame and the second frame if a notification about generation of the first OSD menu from the external display apparatus is not received; and
skipping the image of the first frame if the notification from the external display apparatus is not received.

* * * * *